Dec. 4, 1962  H. R. TEAR  3,066,526
UNBALANCE DETECTION APPARATUS
Original Filed Sept. 18, 1956  2 Sheets-Sheet 1

INVENTOR:
HARRY R. TEAR
BY John C. Black
ATT'Y

Dec. 4, 1962    H. R. TEAR    3,066,526
UNBALANCE DETECTION APPARATUS
Original Filed Sept. 18, 1956    2 Sheets-Sheet 2
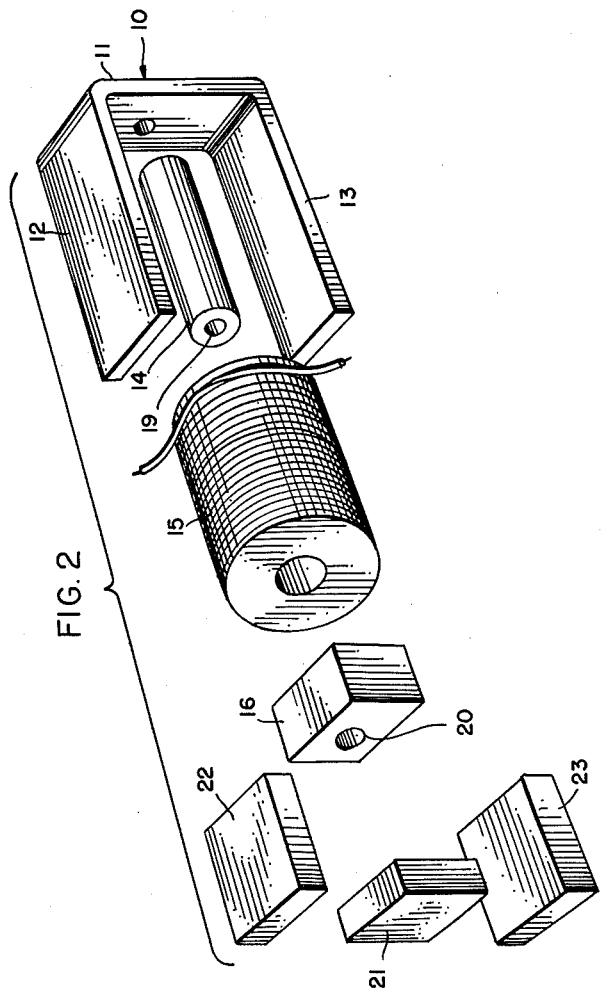
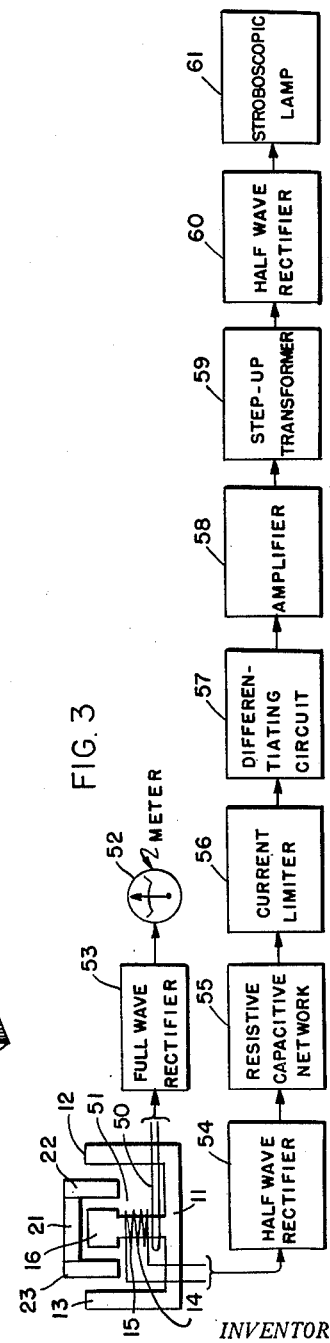
INVENTOR:
HARRY R. TEAR
BY John C. Black
ATT'Y 3,066,526
UNBALANCE DETECTION APPARATUS
Harry R. Tear, Evanston, Ill., assignor to Stewart-Warner Corporation, Chicago, Ill., a corporation of Virginia
Continuation of application Ser. No. 610,587, Sept. 18, 1956. This application Feb. 3, 1960, Ser. No. 6,565
3 Claims. (Cl. 73—71.2)

This invention relates generally to apparatus for detecting unbalance in rotating bodies and more particularly to an improved electromagnetic voltage generator particularly adapted for use in such apparatus.

The present application is a continuation of co-pending U.S. application, Serial No. 610,587, filed September 18, 1956 now abandoned.

The improved voltage generator is used in balancing apparatus of the type disclosed in U.S. Patent No. 2,383,405, issued August 21, 1945, to Merrill et al. and with circuits of the type disclosed in said Merrill patent and in U.S. Patent No. 2,521,141 issued September 5, 1950, to Allen; but it is to be understood that the invention herein is not to be limited to use with the precise apparatus and circuits of Merrill et al. and Allen. Said Merrill and Allen patents are hereby incorporated in the present application as if the disclosures of said patents were set forth fully herein.

For reasons that will be described below, a voltage generator or pickup of the type described must necessarily generate a relatively high voltage with an acceptable wave form with only a small excursion. In addition, it is very important that the wave forms contain information as to voltage and particularly as to phase relationship between the mechanical motion and the voltage generated. The design of the generator requires the phase information and wave form in the signal be matched to the electronic apparatus in order to determine the position and amount of unbalance. Yet its physical dimensions and complexity must be minimized as much as possible. In order to obtain the requisite high voltage, phase relation and wave form, it has been necessary—prior to applicant's invention—to use a relatively expensive construction, for example, that shown in Merrill, with four coils, a special core and expensive magnets. Many attempts were made to reduce the complexity of the generator construction, but each resulted in failure to produce a voltage which would properly phase the stroboscopic lamp with the rotational cycle of the unbalanced body.

By the use of the applicant's new pickup, it has been possible to reduce the coil elements to two (one for the meter, one for the triggering circuit), to use only one less expensive magnet to obtain sharp voltage pickups and even better phasing than was possible before, without going to a prohibitively bulky and expensive structure.

Accordingly, it is a primary object of the present invention to provide a more efficient and substantially less expensive electromagnetic voltage generator pickup unit for balancing apparatus.

It is another primary object of the present invention to provide a pickup of the type described which gives more accurate phasing of the stroboscopic lamp with the rotational cycle of the body being tested for unbalance.

A primary feature of the present invention is the use in such a pickup of an unusually effective, yet less expensive, voltage generator comprising an E-shaped core having a coil wound about the center leg of said core, together with a magnet disposed adjacent the free ends of said core for reciprocal movement therealong and pole pieces secured at either pole of the magnet and projecting a substantial distance into the recesses between adjacent legs of the core.

Another feature is the use of a simple, less expensive magnet.

Another feature is the use of a less expensive core structure.

Another feature is the use of a less expensive coil structure.

Other objects and features will be evident upon a perusal of the following description in which:

FIG. 2 shows an exploded perspective view of the improved voltage generator; and FIG. 3 shows diagrammatically a circuit in which the present invention is utilized.

Figure 1:
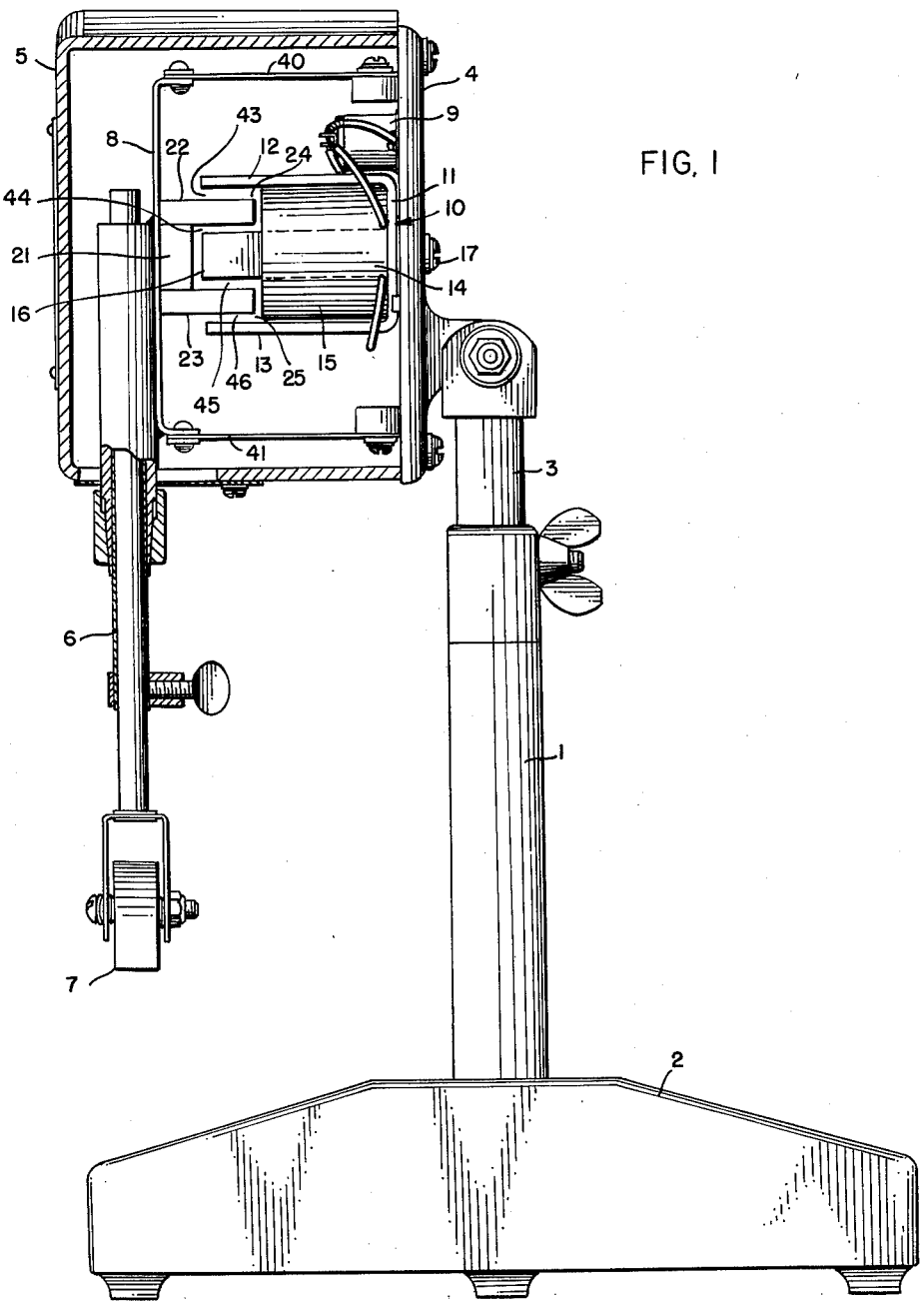
FIG. 1 shows an elevation view, partially in section, of the improved pickup unit together with its supporting base and post and an attachment arm by which it is operatively connected to the body being tested for unbalance or to the supporting structure of the body.

The operation of the device is briefly as follows: a reciprocable electromagnetic voltage generator produces an alternating voltage with a sine wave characteristic, such that maximum peak voltages are obtained as the wheel passes the midpoint between maximum deflections in either direction in the plane of free movement of the voltage generator. Said alternating voltage is then applied to the cathode of a half-wave rectifier to produce a signal corresponding to a predetermined direction of movement of the unbalanced body in said plane. Electronic means, such as that shown by Allen, causes the stroboscopic lamp to fire substantially at the peak of the rectified half-wave so that, by visual observation of the angular position of the wheel, the locus of unbalance can be determined.

The mounting means for improved pickup is substantially the same as that shown in said Merrill patent and will not be described in great detail. Briefly, a post 1 is rigidly secured to a base 2. An adjustable, telescoping extension post 3 is fastened to post 1. Rotatably mounted at the upper end of the extension post 3 is a pickup mounting bracket 4 having a cover 5 secured thereto. A telescoping stem arrangement 6 extends through the cover 5 and has secured at the outer end thereof a magnet 7 which during operation of the balancing equipment is attached to the suspension system of the wheel being balanced in a manner well known in the art. A pair of flexure leaves 40 and 41, secured to the pickup mounting bracket 4 inside cover 5, have a rigid carrier plate 8 secured at their free ends, said carrier plate 8 being rigidly secured to the stem arrangement 6, whereby the stem 6 is adapted for reciprocating movement. A terminal strip 9 is secured to the pickup mounting bracket 4 and provides for electrical connection between the pickup coils and the associated circuits of the balancing apparatus.

The improved magnetic voltage generator will now be described in more detail. A U-shaped bracket 10 (FIG. 2) of a suitable magnetic material provides the base 11 and two outer legs 12 and 13 of an E-shaped core. A cylindrical core element 14 is disposed on the inner side of the base 11, equidistant from the legs 12 and 13 and from either side of base 11.

A coil structure 15, comprising two windings, 50 and 51 (FIG. 3), is mounted on the core element 14 (FIG. 2), and a generally rectangular core end 16 is disposed adjacent the outer ends of core element 14 and coil structure 15. A suitable machine screw 17 (FIG. 1) extends through a bore 18 (FIG. 2) in the core base 11, through a bore 19 in core element 14, and is secured into a threaded bore 20 in the core end 16 to hold the coil 15, element 14 and end 16 rigidly in place.

The simplified permanent magnet structure comprises a generally rectangular permanent magnet 21 rigidly secured to the carrier plate 8 (FIG. 1), for example, by soldering. The magnetic poles of permanent magnet 21 are rigidly secured to generally rectangular pole pieces 22 and 23 of a suitable magnetic material, for example, by soldering.

As shown in FIG. 1, the pole pieces 22 and 23 extend a substantail distance into the recesses 24 and 25 between adjacent core legs 12 and 16 and 16 and 13 respectively. It will further be noted that said pole pieces 22 and 23 are maintained in positions equidistant from their respective adjacent core legs by flexure leaves 40 and 41 so long as no external force is applied to the permanent magnet arrangement by way of the reciprocable magnet stem arrangement 6.

The pickup unit, and its supporting means, are shown in the position which they occupy when not in use to simplify the drawings. It will be understood, of course, that, in actual operation, the pickup base 4 will be rotated 90 degrees in a clockwise direction from the position shown in FIG. 1 for dynamic balancing, and 180 degrees from the position shown in FIG. 1 for kinetic balancing.

For a detailed description of the type circuit used, reference may be had to the Allen patent. Briefly, the pickup coil 50 (FIG. 3) is connected to a volt meter 52 through a full-wave rectifier 53 to indicate the amount of unbalance in the body being balanced. The pickup coil 51 is connected to a half-wave rectifier 54. Only the negative half-cycles of the input voltage, corresponding to a predetermined direction of movement of the body being balanced, appear in the output circuit of the rectifier 54. A resistive-capacitive network 55 in the output circuit of the rectifier 54 acts as a type of automatic volume control so that only the tips, or pulses, in the region of maximum amplitude of the negative half cycles pass to the next stage which comprises a limiter peaking tube 56. The limiter tube 56 produces sharp and limited positive voltage changes in the anode circuit of the first section of the tube and amplifies said voltage changes in the second section of the tube to produce pulses of greater magnitude and opposite phase. The amplified negative pulses are differentiated by a differentiating capacitive-resistive circuit 57 to produce relatively sharp, large magnitude negative pulses and smaller positive pulses. Said negative and positive pulses are amplified and inverted by an amplifier tube 58 to produce relatively sharp and large magnitude positive pulses and smaller negative pulses. Said last-mentioned pulses are applied to the primary winding of a differentiating and coupling step-up transformer 59, the secondary winding of which is connected across a half-wave rectifier tube 60, which tube eliminates the unwanted negative peaks. The voltage pulses appearing across output of the rectifier 60 are supplied to the stroboscopic lamp 61 through a capacitive coupling to cause the stroboscopic lamp to fire.

It is of primary importance that the voltage generated by the pickup coil 51 be relatively high and of proper wave form, so that the tips, or pulses, picked off by capacitive-resistive network 55 are as narrow a portion of each cycle as possible. As the voltage becomes higher, the pulses become narrower and the phasing of the lamp with the motion of the body becomes more accurate.

The following description of the theory of operation of the improved electromagnetic voltage generator is believed by the applicant to be technically accurate; however, it is to be understood that he is not to be bound thereby.

With the pole pieces 22 and 23 centered between their respective adjacent core legs, as shown in FIG. 1, one external magnetic flux path will extend from pole piece 22 through air gap 43 at the upper end of recess 24, core leg 12, core base 11, core leg 13 and air gap 46 at the lower end of recess 25 to pole piece 23; and the other external magnetic flux path will extend from pole piece 22 through air gap 44 at the lower end of recess 24, core end 16 and air gap 45 at the upper end of recess 25 to pole piece 23. Inasmuch as the air gaps on either side of pole pieces 22 and 23 are equal, substantially no magnetic flux will pass from the core end 16 through center core element 14 to the core base 11.

Assume that, due to the vibration of a rotating body being balanced, the permanent magnet structure begins to move upwardly with respect to FIG. 1. As the upper surfaces of the pole pieces 22 and 23 move toward the lower surfaces of leg 12 and core end 16 and as the lower surfaces of pole pieces 22 and 23 move away from the upper surfaces of core end 16 and leg 13, the external magnetic flux paths are varied, a continuously increasing amount of flux being directed through a flux path extending from pole piece 22 through air gap 43, core leg 12, core base 11, core element 14, core end 16 and air gap 45 to pole piece 23. This change in flux through the center leg of the core 10, together with a corresponding increase in flux through the upper leg 12 and decreases in flux through the lower leg 13, gives rise to a voltage being induced in the windings of coil structure 15.

After the magnet structure reaches its uppermost position, depending upon the maximum deflection of the unbalanced body, it begins its downward movement. The flux in core leg 12 and core element 14 begins to decrease and that in core leg 13 begins to increase, until, at the position shown in FIG. 1, the first described flux paths are re-established. The change in flux in core legs 12 and 13 and core element 14 gives rise to a voltage being induced in the windings of coil structure 15.

As the magnet structure moves downwardly with respect to the postion shown in FIG. 1, a continuously increasing amount of flux is directed through a magnetic flux path extending form pole piece 22, air gap 44, core end 16, core element 14, core base 11, core leg 13 and air gap 46 to pole piece 23. This increase in flux in core element 14 together with a corresponding increase in flux in core leg 13 and decrease in flux in core leg 12 gives rise to voltage being induced in the windings of coil structure 15.

After the magnet structure reaches its lowermost position, it begins its upward movement. The flux in core leg 13 and core element 14 begins to decrease and that in core leg 12 begins to increase, until, at the position shown in FIG. 1, the first-described flux paths are again re-established. Again a voltage is induced in the windings of coil structure 15.

As is well known, the voltage generated in a coil is proportional to the rate of change of magnetic flux cutting the coil. Consequently, the voltage generated in windings 50 and 51 (FIG. 3) will be dependent upon the change of flux in core legs 12 and 13 and core element 14, which change in flux is controlled by the relative motion of the pole pieces 22 and 23 with respect to core legs 12 and 13 and core end 16. This in turn is controlled by the cyclical movement of the body being balanced. As described in the Merrill patent, the body is rotated by a spinner to a speed above its resonant frequency and then permitted to rotate freely. A curve showing the magnitude and direction of the deflection of the body in one plane will approximate a sine wave, with zero rate of change at the extreme limits of deflection and maximum rate of change at the midpoint therebetween. Induced voltage will, therefore, be 90 degrees out of phase with the deflection. The deflection will, as is well known, lag the locus of unbalance in the body being balanced by 90 degrees at resonance. Cosequently, the visual observation of the rotating body is made at resonance for the sake of accuracy. Resonance is determined by use of the meter 52 which gives maximum reading at resonance because deflection is maximum at resonance, as is well known. Inasmuch as the magnitude of the voltage generated in coil 51 will be 90 degrees out of phase with the magnitude of the flux in the core element 19, which latter flux is in phase with the deflection and, therefore, lagging the locus of unbalance by 90 degrees at resonance, the output voltage from coil 51, when connected properly, will at resonance be 180 degrees out of phase with the locus of unbalance. Therefore, an induced voltage can be obtained having a definite and substantially unvarying relationship with angular position of the locus of unbalance in a rotating body, which voltage can by means of a circuit such as that shown in the Allen patent cause a stroboscopic lamp to instantaneously fire at a predetermined point in the rotative cycle of the body being tested.

It it again to be noted that innumerable arrangements of magnet, pole pieces, coil and core were attempted in an effort to obtain satisfactory phasing of the stroboscopic device with a simple inexpensive, magnetic structure. However, until the configuration disclosed herein was discovered, the phasing of the stroboscopic device was erratic, varying appreciably with variations in operating amplitude and frequency.

While there has been described what is at present believed to be the preferred embodiment of the invention, it will be understood that modifications may be made therein; and it is contemplated to cover in the appended claims all such modifications as fall within the true spirit and scope of the invention.

What is claimed is:

1. In unbalance detection apparatus of the type in which circuit means, energized by electrical control signals of proper wave form and of sufficient potential generated in synchronism and fixed phase relation with low amplitude vibrations produced by unbalance in a rotating body, cause a stroboscopic device to be operated at a predetermined cyclic point of said signals to permit visual determination of the locus of said unbalance, the combination with the circuit means and stroboscopic device of an electromagnetic signal generator producing the control signals comprising a first assembly including a generally E-shaped magnetic core having a base and three legs extending perpendicularly therefrom, a coil wound about the center leg of the core adjacent the base, the legs of the core extending a substantial distance beyond the coil; a second assembly including a permanent magnet having pole pieces secured to either magnetic pole, a substantial portion of the pole pieces extending into the recesses between adjacent legs of the core, the juxtaposed surfaces of the core legs and pole pieces forming enlarged overlapping areas lying in substantially parallel planes; resilient structure-mounting one of the assemblies for reciprocable motion substantially perpendicular to the parallel surfaces and normally biasing the one assembly for equidistant positioning of the juxtaposed surfaces from each other; and means operated in accordance with body deflection produced by unbalance imparting reciprocating motion to the one assembly to produce signals in accordance with the deflection.

2. In unbalanced detection apparatus of the type in which circuit means, energized by electrical control signals of proper wave form and of sufficient potential generated in synchronism and fixed phase relation with low amplitude vibrations produced by unbalance in a rotating body, cause a stroboscopic device to be operated at a predetermined cyclic point of said signals to permit visual determination of the locus of said unbalance, the combination with the circuit means and stroboscopic device of an electromagnetic signal generator producing the control signals comprising a generally E-shaped magnetic core having a base and three legs extending perpendicularly therefrom, a coil wound about the center leg of the core adjacent the base, the legs of the core extending a substantial distance beyond the coil, a permanent magnet having pole pieces secured to either magnetic pole, a substantial portion of the pole pieces extending into the recesses between adjacent legs of the core, the juxtaposed surfaces of the core legs and pole pieces forming enlarged overlapping areas lying in substantially parallel planes, resilient structure mounting the magnet and pole pieces for reciprocable motion substantially perpendicular to the parallel surfaces and normally biasing the pole pieces to positions equidistant from the core legs, and means adapted for actuation by the body imparting reciprocating motion to the pole pieces to produce signals in accordance with deflection produced by body unbalance.

3. In unbalance detection apparatus of the type in which means controlled by electrical signals of proper wave form and high amplitude generated in synchronism with low amplitude cyclical vibrations produced by unbalance in a rotating body cause a stroboscopic device to be operated at a predetermined cyclic point of the signals to permit visual determination of the locus of unbalance, a short-excursion electromagnetic generator for producing high amplitude control signal of desired wave form in fixed phase relation with the cyclical vibrations for operation of the stroboscopic device comprising a pair of adjacently disposed assemblies, one of the assemblies including a generally E-shaped core having a base and three legs, the legs at their outer ends having parallel juxtaposed surfaces of substantial width and a coil wound about the center leg of the core, the outer ends of the legs extending a substantial distance beyond the coil; the other assembly including a permanent magnet and a pair of pole pieces secured to respective poles of the magnet and extending a substantial distance into the spaces between adjacent core legs, the pole pieces at their outer ends having surfaces parallel to said leg surfaces and of substantial width; and a pair of spaced flexure leaves resiliently mounting one of the assemblies for relative reciprocating motion between the pole pieces and the core legs in a direction normal to their parallel surfaces and normally biasing the one assembly for equidistant positioning of the core leg surfaces and the pole piece surfaces from each other.

References Cited in the file of this patent

UNITED STATES PATENTS

| | | |
|---|---|---|
| 2,111,643 | Salvatori | Mar. 22, 1938 |
| 2,303,413 | Washburn | Dec. 1, 1942 |
| 2,383,405 | Merrill et al. | Aug. 21, 1945 |
| 2,521,141 | Allen | Sept. 5, 1950 |
| 2,740,946 | Geneslay | Apr. 3, 1956 |
| 2,895,064 | Hoff et al. | July 14, 1959 |

UNITED STATES PATENT OFFICE
CERTIFICATE OF CORRECTION

Patent No. 3,066,526                      December 4, 1962

Harry R. Tear

It is hereby certified that error appears in the above numbered patent requiring correction and that the said Letters Patent should read as corrected below.

Column 6, line 6, for "thte" read -- the --; line 32, for "signal" read -- signals --.

Signed and sealed this 31st day of March 1964.

(SEAL)
Attest:
ERNEST W. SWIDER

Attesting Officer

EDWARD J. BRENNER

Commissioner of Patents